US008842820B2

United States Patent
Fan et al.

(10) Patent No.: US 8,842,820 B2
(45) Date of Patent: Sep. 23, 2014

(54) ENHANCED CONTACT CENTER ARCHITECTURE TO SUPPORT AGENT RESOURCE OPTIMIZATION

(75) Inventors: James Fan, San Ramon, CA (US); Jennifer K. Lam, Fremont, CA (US); Deva-Datta Sharma, San Ramon, CA (US); Eric Towell, Mukwonago, WI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1048 days.

(21) Appl. No.: 12/619,257

(22) Filed: Nov. 16, 2009

(65) Prior Publication Data

US 2011/0116617 A1    May 19, 2011

(51) Int. Cl.
- *H04M 3/00* (2006.01)
- *H04M 5/00* (2006.01)
- *H04M 3/523* (2006.01)
- *H04M 3/51* (2006.01)

(52) U.S. Cl.
CPC ...... *H04M 3/5232* (2013.01); *H04M 2203/551* (2013.01); *H04M 3/5191* (2013.01)
USPC ............ 379/265.11; 379/265.02; 379/265.13; 379/266.01

(58) Field of Classification Search
CPC .......... H04M 3/5233; H04M 3/42068; H04M 3/5232; H04M 3/523; H04M 3/42059
USPC ............... 379/265.01, 265.02, 265.09, 265.1, 379/265.11, 265.13, 266.01–266.08
See application file for complete search history.

(56) References Cited

U.S. PATENT DOCUMENTS

| | | | |
|---|---|---|---|
| 7,054,434 B2 * | 5/2006 | Rodenbusch et al. | 379/265.02 |
| 7,366,291 B2 | 4/2008 | Crockett et al. | |
| 7,512,224 B2 | 3/2009 | Crockett et al. | |
| 7,801,111 B2 * | 9/2010 | Coussement | 379/265.13 |
| 7,949,121 B1 * | 5/2011 | Flockhart et al. | 379/265.02 |

OTHER PUBLICATIONS

U.S. Appl. No. 12/580,448 to James Fan et al., filed Oct. 16, 2009.

* cited by examiner

*Primary Examiner* — Nafiz E Hoque
(74) *Attorney, Agent, or Firm* — Greenblum & Bernstein, P.L.C.

(57) ABSTRACT

Routing communications at a communications center includes servicing a first communication concurrently with receiving a second communication, at the communications center. It is determined, using a tangible first processor, whether a sender of the first communication and a sender of the second communication are associated with a common account. The second communication is routed to an agent based on the determining.

13 Claims, 4 Drawing Sheets

ENHANCED CONTACT CENTER ARCHITECTURE TO SUPPORT AGENT RESOURCE OPTIMIZATION

BACKGROUND

1. Field of the Disclosure

The present disclosure relates to the field of routing communications received at a communications center. More particularly, the present disclosure relates to systems and methods for enhancing a contact center architecture to support agent resource optimization.

2. Background Information

Customers communicate with service providers via service channels to inquire about products, services and bills, as well as to report issues with a product or service. A service channel may be, for example, a voice service channel or an Internet service channel. Telephone calls are received over the voice service channel and Internet communications are received over the Internet service channel. Each type of service channel may have a distinct routing engine and a corresponding, distinct group of agents. When a customer initiates a self-service contact session over the Internet service channel and subsequently requests communication with an agent, the communication is routed to an available agent by a routing engine particular to the Internet service channel. When a customer initiates a self-service contact session over a voice service channel and subsequently requests communication with an agent, the communication is routed to an available agent by another routing engine that is particular to the voice service channel.

DETAILED DESCRIPTION

Figure 1:
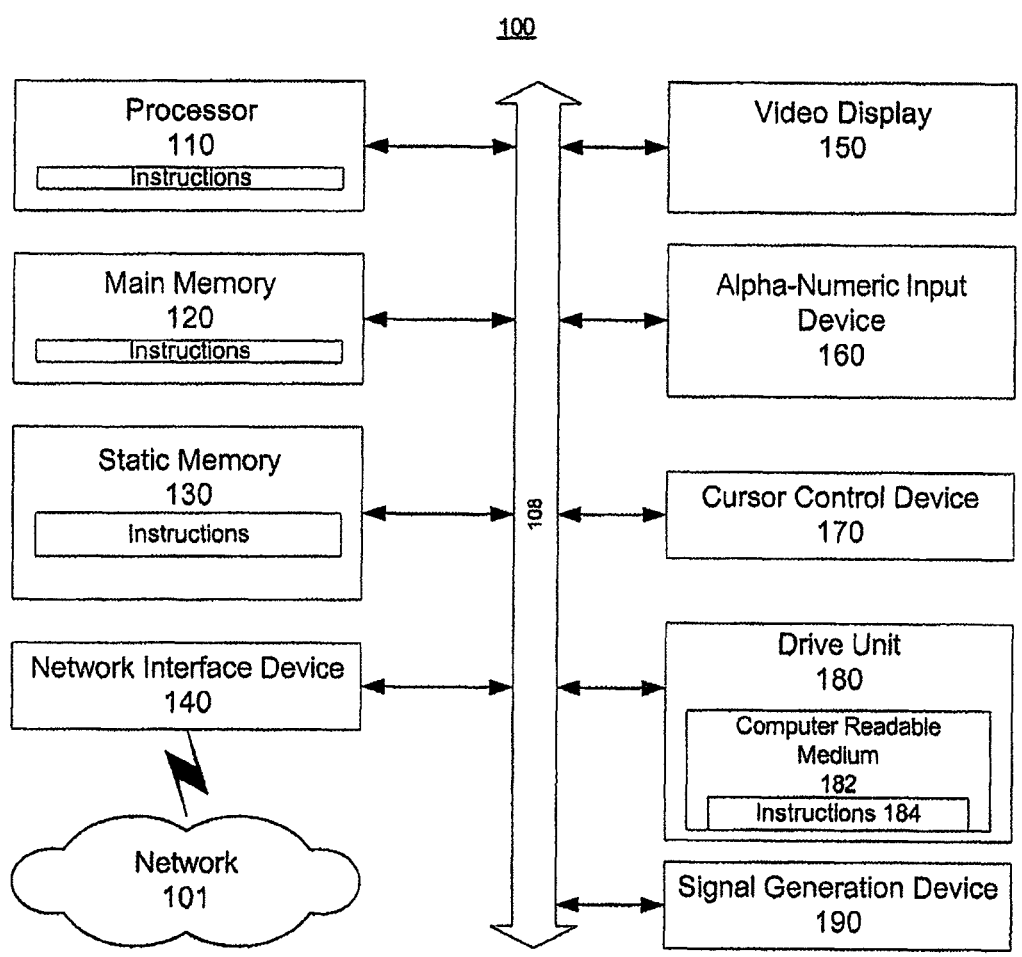
FIG. 1 shows an exemplary general computer system that includes a set of instructions for enhanced contact center architecture to support agent resource optimization.

In view of the foregoing, the present disclosure, through one or more of its various aspects, embodiments and/or specific features or sub-components, is thus intended to bring out one or more of the advantages as specifically noted below.

According to an aspect of the present application, a method for routing communications at a communications center includes servicing a first communication concurrently with receiving a second communication, at the communications center. The method includes determining, using a tangible first processor, whether a sender of the first communication and a sender of the second communication are associated with a common account. The method also includes routing the second communication to an agent based on the determining.

According to another aspect of the present application, the first communication is received via a first type of service channel, and the second communication is received via a second type of service channel.

According to yet another aspect of the present application, the agent services the first communication.

According to still another aspect of the present application, the second communication is routed to the agent servicing the first communication when the agent services the first type of service channel and the second type of service channel.

According to an aspect of the present application, the first type of service channel comprises at least one of: an interactive voice response service channel and a web-enabled service channel, and the second type of service channel comprises at least one of: an interactive voice response service channel and a web-enabled service channel.

According to another aspect of the present application, the first communication is routed to the agent and the second communication is routed to a second agent when the agent does not service the second type of service channel.

According to yet another aspect of the present application, the method includes receiving a first request, from the sender of the first communication, for agent-enabled communication and receiving a second request, from the sender of the second communication, for the agent-enabled communication.

According to still another aspect of the present application, the sender of the first communication and the sender of the second communication is a common individual associated with the common account.

According to an aspect of the present application, the sender of the first communication and the sender of the second communication are members of a common entity for the common account, and the common entity comprises at least one of: an organization, a business, a family and a school.

According to an aspect of the present application, the agent is distinct from a first agent servicing the first communication.

According to another aspect of the present application, the second communication is routed to the agent when the first agent servicing the first communication is not enabled to service a type of service channel via which the second communication was received.

According to yet another aspect of the present application, the second communication is routed to the agent when the first agent servicing the first communication is not available to service further communication.

According to still another aspect of the present application, the method includes querying a resource optimizer, implemented on at least one processor, to determine whether a first communication, associated with the common account, is being serviced.

According to an aspect of the present application, a system for routing communications at a communications center includes a receiver that receives a first communication, at the communications center, concurrently with receiving a second communication, at the communications center. The system includes a resource optimizer, implemented on a first tangible processor, that determines whether a sender of the first communication and a sender of the second communication are associated with a common account. The system also includes a route determiner, implemented on a second tangible processor, that routes the second communication to an agent based on the determination. The first communication is serviced at the communications center.

According to another aspect of the present application, the resource optimizer maintains a mapping for a subscriber account to contact session associated with the first communication being serviced.

According to yet another aspect of the present application, the resource optimizer sends an alert to the route determiner when a second connect session associated with the second communication is initiated and the mapping exists.

According to still another aspect of the present application, the resource optimizer stores agent state information for the agent. At least one of the agents services the first communication.

According to an aspect of the present application, the route determiner utilizes the agent state information to route the second communication.

According to another aspect of the present application, the sender of the second communication is informed that communication is not permitted when the sender of the first communication and the sender of the second communication are associated with the common account.

According to an aspect of the present application, a tangible computer readable medium storing a computer program, recorded on the tangible computer readable medium, for routing communications at a communications center includes a servicing code segment, recorded on the tangible computer readable medium, that services a first communication, at the communications center, concurrently with receiving a second communication, at the communications center. The tangible computer readable medium includes a determining code segment, recorded on the tangible computer readable medium, that determines whether a sender of the first communication and a sender of the second communication are associated with a common account. The tangible computer readable medium includes a routing code segment, recorded on the tangible computer readable medium, that routes the second communication to an agent based on the determination.

FIG. 1 is an illustrative embodiment of a general computer system, on which a method to provide enhanced contact center architecture to support agent resource optimization can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 126, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

According to an aspect of the present disclosure, communications received via different types of service channels are routed via an integrated routing model. Accordingly, resources are conserved, customers are served more efficiently and generating duplicate tickets is avoided. If two different agents communicate with the same customer, different solutions could be suggested by each of the agents and multiple trouble tickets may be generated, which would in turn, trigger a number of separate maintenance dispatches.

According to another aspect of the present disclosure, state information for agents receiving communications via an Internet service channel is stored by an Internet service channel routing engine. State information for agents receiving communications via a voice service channel is stored by a voice service channel routing engine. State information includes, for example, any of the following, but not limited to: whether an agent is currently servicing a contact session, a number of contact sessions currently being serviced by the agent, whether the agent has reached a maximum capacity for servicing contact sessions and communications and/or contact sessions waiting in queue for the agent. State information stored by the Internet service channel routing engine is shared with the voice service channel routing engine. Further, state information stored by the voice service channel routing engine is shared with the Internet service channel routing engine. Without the above-noted integrated routing model, when a single agent services both communications received via an Internet service channel and communications received via a voice service channel, an Internet service channel routing engine would have no state information as to whether the agent has reached a maximum capacity for servicing voice contact sessions or alternatively, for servicing any contact sessions. Further, the voice service channel routing engine would have no state information as to whether the agent has reached a maximum capacity for servicing Internet contact sessions, or alternatively, for servicing any contact sessions.

According to yet another aspect of the present application, a common contact routing engine is used to route both communications received via an Internet service channel and communications received via a voice service channel to different agent queues. The present application obviates a situation in which two agents (i.e., one agent servicing an Internet service channel and the other agent servicing a voice service channel) concurrently communicate with the same customer or two customers associated with a common subscriber account.

According to still another aspect of the present application, a cost-effective manner of managing an agent pool or agent pools is provided.

Figure 2A:
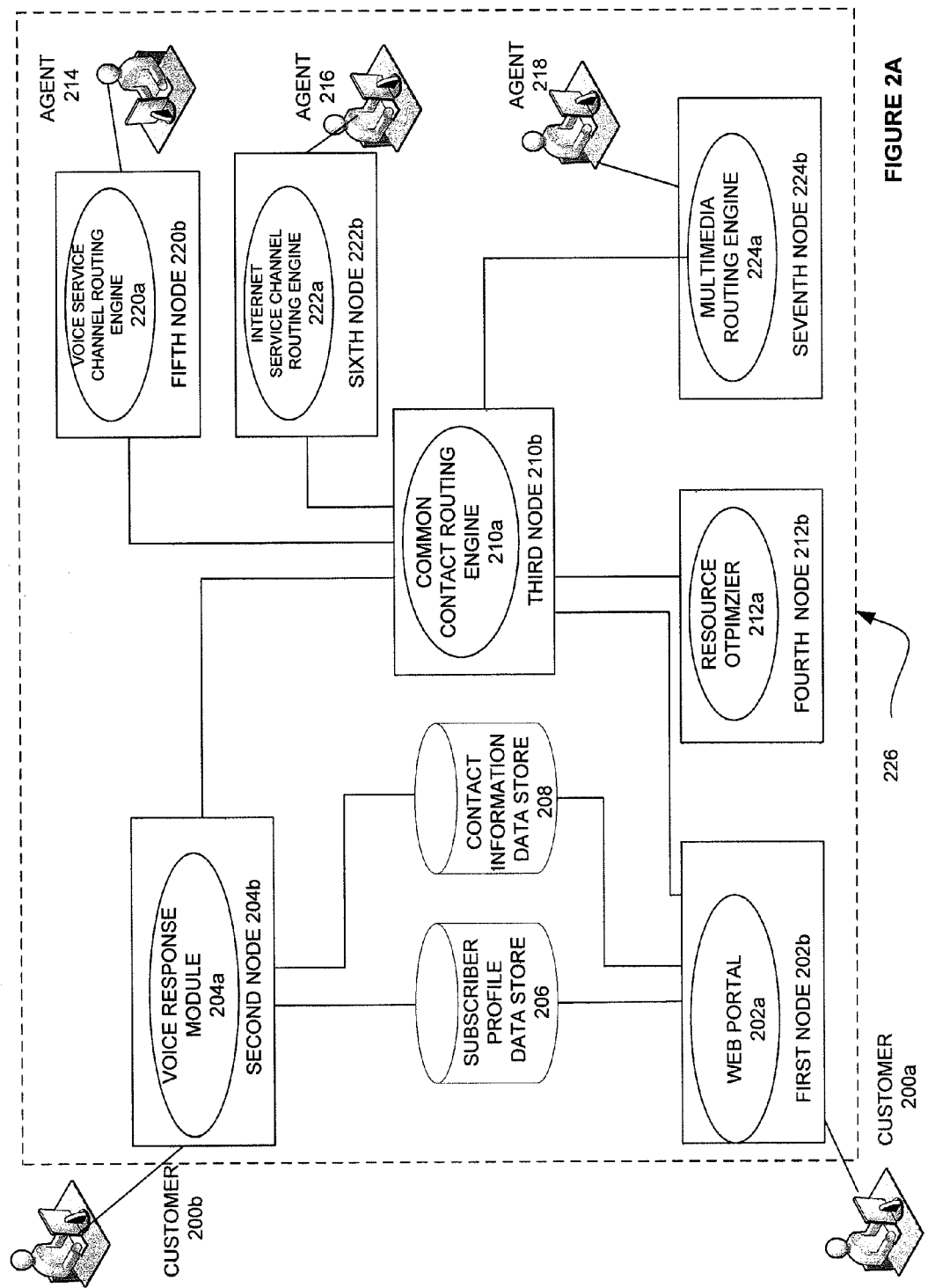
FIG. 2A shows a system diagram for enhanced contact center architecture to support agent resource optimization, according to an aspect of the present disclosure.

In FIG. 2A, a system diagram of the present disclosure is shown. A customer 200a communicates in a contact session over an Internet service channel (not shown) via a web portal 202a implemented on a first node 202b at a communications center 226. A customer 200b communicates in a contact session over an voice service channel (not shown) via a voice response module 204a implemented on a second node 204b at the communications center 226. Communications are routed, by a common contact routing engine 210a implemented on third node 210b, to one of agents 214, 216 and 218. The common contact routing engine 210a communicates with a voice service channel routing engine 220a implemented a fifth node 220b to route communications received via the voice service channel to agent 214, agent 214 capable of servicing only voice contact sessions. The common contact routing engine 210a communicates with an Internet service channel routing engine 222a implemented on sixth node 222b to route communications received via the Internet service channel to agent 216, agent 216 capable of servicing only Internet contact sessions. The common contact routing engine 210a communicates with a multimedia routing engine 224a implemented on a seventh node 224b to route communications received via either the Internet service channel or the voice service channel to agent 218, agent 218 capable of servicing voice contact sessions and Internet contact sessions.

Figure 2B:
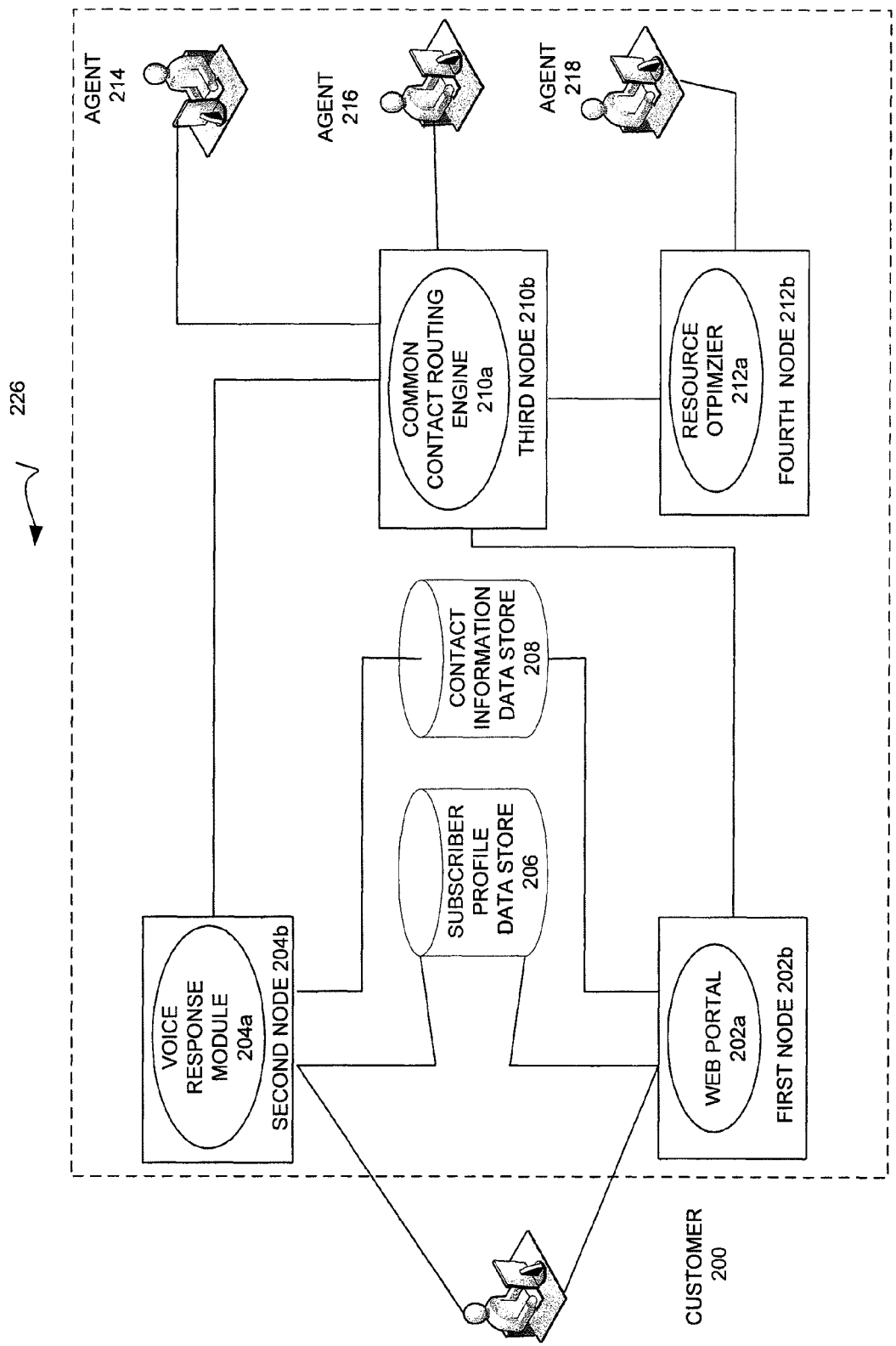
FIG. 2B shows a system diagram for enhanced contact center architecture to support agent resource optimization, according to another aspect of the present disclosure.

As will be understood by one of ordinary skill in the art, each of the first node 202b, the second node 204b, the third node 210b, a fourth node 212b, the fifth node 220b, the sixth node 222b and the seventh node 224b are any tangible physical device upon which a software application is implementable or upon which a set of computer instructions are executable. For example, a node is any of the following, but not limited to: a processor, a network element, a server, a computing device, a physical storage and a physical memory. Each of the first node 202b, the second node 204b, the third node 210b, a fourth node 212b, the fifth node 220b, the sixth node 222b and the seventh node 224b are shown in FIGS. 2A and 2B as seven distinct nodes. However, as will be understood by one of ordinary skill in the art, all of the illustrated nodes are implementable as a single node or any number of nodes.

As will also be understood by one of ordinary skill in the art, a service channel refers to a combination hardware media and communications protocols that are used to send and receive communication. The voice service channel is implementable by any one or combination of the following, but not limited to: a public switched telephone network (PSTN), a digital telephone network, a voice over internet protocol (VoIP) telephony network, a telecommunications network or any other audible communications network, without departing from the spirit and scope of the present disclosure. Hardware media includes physical links of the above-noted networks, which include any of the following, but are not limited to: copper wire, coaxial cable and optical fiber. In one embodiment, voice contact sessions are conducted via self-service channels including, for example, an interactive voice response system service channel. In another embodiment, voice contact sessions are conducted via agent-enabled channels, including for example, speaking with an agent, at the communications center 226, that services telephone calls. As will be understood by one of ordinary skill in the art, the agent is either a human agent or an automated agent.

The Internet service channel is implementable by any one or combination of the following, but not limited to: satellite networks, wide area networks (WANs), local area networks (LANs), wireless networks, or any other data network, without departing from the spirit and scope of the present disclosure. Hardware media includes physical links of the above-noted networks, which include any of the following, but are not limited to: copper wire, coaxial cable and optical fiber. In one embodiment, Internet contact sessions are conducted via self-service channels including, for example, a web form submission service channel and an email service channel. In another embodiment, Internet contact sessions are conducted via agent-enabled channels, including for example, communicating with an agent, at the communications center 226, that services chat sessions conducted by a web client. Another example of an agent-enabled service channel includes video-conferencing sessions that are serviced by an agent at the communications center 226. As will be understood by one of ordinary skill in the art, the agent is either a human agent or an automated agent.

A common contact routing engine 210a is implemented on a third node 210b. The common contact routing engine 210a enables selection of an agent 214, 216 and 218 to service incoming communication received as part of a contact session. The common contact routing engine 210a consults a resource optimizer 212a implemented on a fourth node 212b prior to routing an incoming communication, received at either the voice response module 204a or the web portal 202a, to an available agent agent. The result of the consultation causes the common contact routing engine 210a to determine or adjust routing decisions. When the customer 200b initiates a contact session via the voice service channel, the voice communication is received and the voice contact session is serviced by the voice response module 204a implemented on the second node 204b. When the customer 200b subsequently requests an agent to service the voice contact session, the common contact routing engine 210a routes the communication to a selected agent 214 that is enabled to service voice contact sessions. When a customer 200a initiates a contact session via the Internet service channel, the web communication is received and the Internet contact session is serviced by the web portal 202a implemented on the first node 202b. When the customer 200a requests an agent to service the Internet contact session, the common contact routing engine 210a routes the communication to a selected agent 216 that is enabled to service Internet contact sessions. In an alternative embodiment, communications are routed to agent 218, that is enabled to service both voice contact sessions and Internet contact sessions.

The resource optimizer 212a provides the common contact routing engine 210a with account-related information for customers contacting the communications center 226. In one embodiment, customer 200a and customer 200b are associated with a common account. For example, customer 200a and customer 200b are members of a common organization, family, business entity or other group of individuals or entities associated with a single subscriber account. As will understood by one of ordinary skill in the art, two customers are shown in FIG. 2A, however, any number of customers associated with a common account are enabled to contact the communications center 226, concurrently or simultaneously. In another embodiment, each of customers 200a and 200b contact the communications center via the same type of service channel (e.g., both customers 200a and 200b are different individuals and contact the communications center 226 using the voice service channel). In another embodiment, customers 200a and 200b are different individuals and contact the communications center via a number of different methods using a common type of service channel (e.g., customer 200a initiates a chat session and customer 200b initiates a videoconference session via the Internet service channel).

The resource optimizer 212a determines whether a sender of the incoming communication is associated with a common account, to which another communication currently being serviced corresponds, and provides associated mapping information to the common contact routing engine 210a. In another embodiment, the resource optimizer 212a determines whether the senders of concurrently incoming communications (i.e., concurrently received communications) or simultaneously incoming communications are associated with a common account. When the resource optimizer 212a determines that the incoming communications are associated with a common account, the resource optimizer 212a stores a mapping of the account and a communication identifier or communication identifiers for the sender or the senders of the incoming communications. The resource optimizer 212a provides the mapping information to the common contact routing engine 210a, when queried by the common contact routing engine 210a. Using the mapping information, the common contact routing engine 210a routes the communications received from the senders associated with a common account to the same agent. When the agent cannot service different types of service channels and the communications are received via different types of service channels, the communications are routed to different agents. When the agent is currently servicing a communication received via a first type of service channel and is at a maximum capacity for servicing communications, or for servicing a particular type of communication, the second communication is routed to an available agent. In an alternative embodiment, if the agent is enabled to service Internet contact sessions, the common contact routing engine 210a informs the sender of the communication that a chat is not allowed at a current time. In yet another embodiment, if the agent servicing the first contact session is not enabled to service Internet contact sessions, the common contact routing engine informs the sender of the communications over the Internet contact session that the Internet contact session is not allowed at the current time because an issue is being reported by another user associated with the same account.

The resource optimizer 212a also accesses each individual routing module for each type of service channel (i.e., voice service channel routing engine 220a, Internet service channel routing engine 222a and multimedia routing engine 224a), to retrieve and store information corresponding to each agent servicing communications. The resource optimizer 212a stores information relating an agent servicing a communication with a sender of the communication. Additionally, the resource optimizer 210a stores state information including any of the following, but not limited to: whether an agent is currently servicing a contact session, a number of contact sessions currently being serviced by the agent, whether the agent has reached a maximum capacity for servicing contact sessions and communications and/or contact sessions waiting in queue for the agent. Accordingly, the common contact routing engine 210a is provided with agent state information for each type of service channel, when the resource optimizer 212a is queried. Alternatively, information corresponding to each agent servicing communication is retrieved directly from common contact routing engine 210a. As will be understood by one of ordinary skill in the art, the common contact routing engine 210a is merely "aware" of the size of a queue of communications waiting to be serviced, or in another embodiment, whether each of the agents is available or occupied. As discussed above, the resource optimizer 212a provides the common contact routing engine 210a with more detailed information as to agent state information.

The common contact routing engine 210a queries the resource optimizer 212a prior to routing communication associated with a second contact session to an available agent to determine whether there is an active contact session already established for a customer account associated with an initiator of the second contact session (i.e., customer 200b). If there is an active contact session associated with the customer account, the common contact routing engine 210a attempts to route the communication associated with the second contact session to the same agent (i.e., when the agent is able to service the voice service channel and the Internet service channel) currently servicing a first, active contact session. The common contact routing engine 210a selects and routes the second contact session to an agent 216 enabled to service chat sessions. When there is no common contact routing engine, if all agents are enabled to service voice communications and Internet communications, Internet service channel routing engine 222a queries the resource optimizer 212a to determine whether an agent is available to service an Internet contact session that is not currently occupied by servicing a voice contact session. If a specified agent is occupied with servicing a voice contact session, the Internet service channel routing engine 222a selects a next available agent and sends another query to resource optimizer 212a to determine a routing decision.

The common contact routing engine 210a communicates with a voice service channel routing engine 220a implemented the fifth node 220b to route communications received via the voice service channel to agent 214, agent 214 capable of servicing only voice contact sessions. The common contact routing engine 210a communicates with an Internet service channel routing engine 222a implemented on the sixth node 222b to route communications received via the Internet service channel to agent 216, agent 216 capable of servicing only Internet contact sessions. The common contact routing engine 210a communicates with a multimedia routing engine 224a implemented on the seventh node 224b to route communications received via either the Internet service channel or a voice service channel to agent 218, agent 218 capable of servicing voice contact sessions and Internet contact sessions. Also shown in FIG. 2A are a subscriber profile data store 206 that stores information related to products and services that a subscriber has ordered, pending order information, billing status as well as recently reported issues and a contact information data store 208 that logs information related to customer interaction for active contact sessions. Information stored in the subscriber profile data store 206 and the contact information data store 208 is used to service contact sessions. In particular, the web portal 202a and the voice response module 204a access the subscriber profile data store 206 and each establish a contact session log.

In FIG. 2B, an alternative embodiment of the present disclosure is shown. In the illustrated embodiment, a single user 200 is shown is connecting to the communications center 226 via a web portal 202a and a voice response module 204a. Further, common contact routing engine 210a is shown as directly connected to agent 214, agent 216 and agent 218. In one embodiment, customer 200 contacts the communications center 226 via two different types of service channels (e.g., the customer places a telephone call to the communications center 226 and concurrently initiates a chat session using a web client). In another embodiment, customer 200 contacts the communications center 226 via a number of different methods, using the same type of service channel (e.g., the customer sends an email, initiates a chat session and/or initiates a videoconferencing session). The resource optimizer 212a retrieves information corresponding to each agent servicing communication directly from common contact routing engine 210a. Information is exchanged in a manner substantially similar to the manner described above with respect to FIG. 2A and is not reiterated herein with respect to FIG. 2B.

Figure 3:
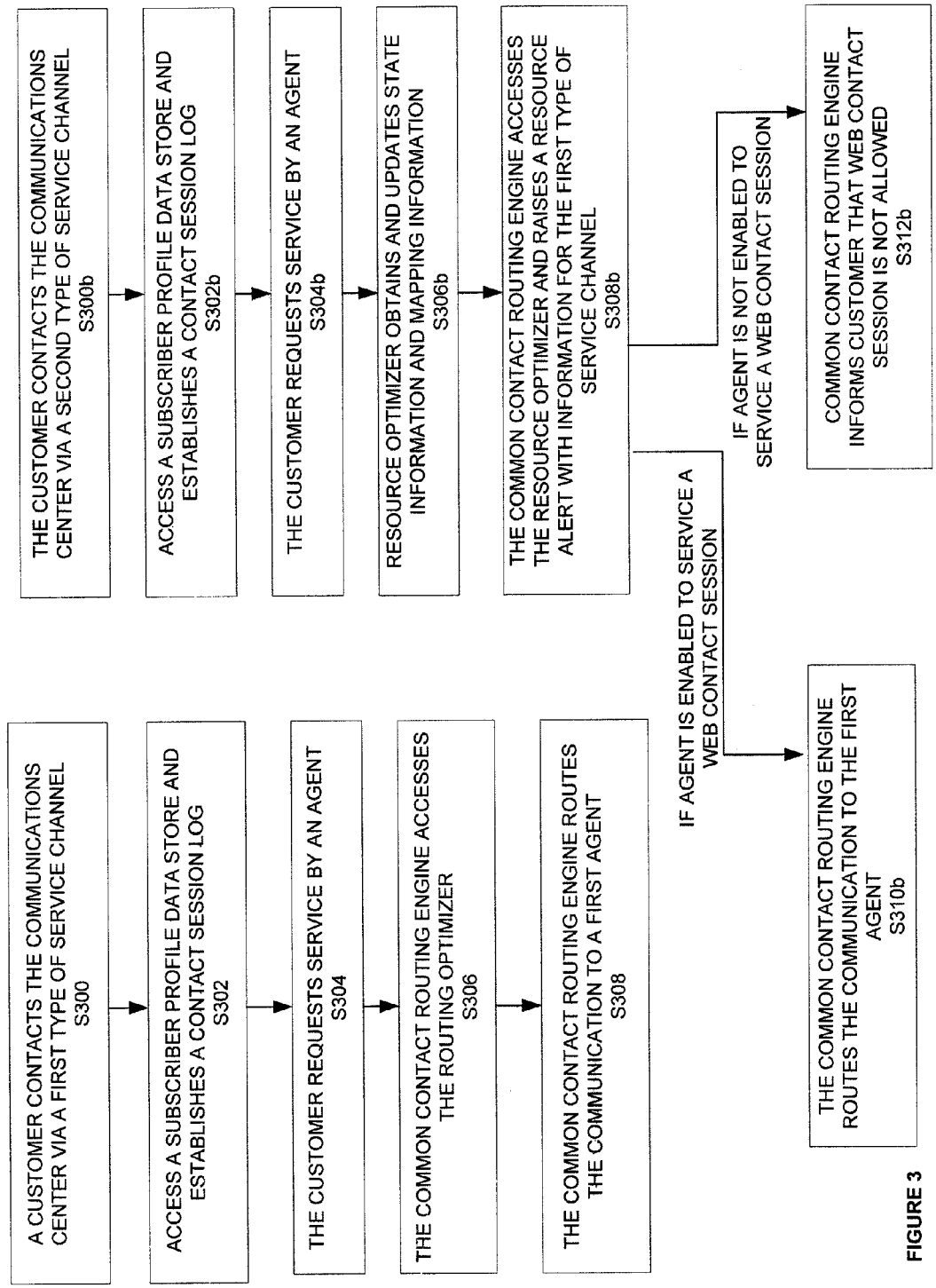
FIG. 3 shows a process flow diagram for enhanced contact center architecture to support agent resource optimization, according to an aspect of the present disclosure.

Referring now to FIG. 3, a process flow diagram for detecting and routing concurrent contact sessions associated with a common account is shown. In step S300, a customer contacts the communications center via an interactive voice response system service channel. In step S302, the interactive voice response system service channel accesses the subscriber profile database and establishes a contact session log. In step S304, the customer requests service by an agent. In step S306, the common contact routing engine queries the resource optimizer and in step S308, the common contact routing engine routes the communication to a first agent.

The customer also contacts the communications center via an Internet service channel, either simultaneously with, concurrently with or subsequently to the first contact session. As will be understood by one of ordinary skill in the art and as discussed above, in one embodiment, the customer contacts the communications center via two different types of service channels (e.g., the customer places a telephone call to the communications center 226 and concurrently initiates a chat session using a web client). In another embodiment, the customer contacts the communications center 226 via a number of different methods, using the same type of service channel (e.g., the customer sends an email, initiates a chat session and/or initiates a videoconferencing session). In yet another embodiment, there are more than one distinct customer that are associated with a common account, for example, a first customer and a second customer that are members of a common organization, family, business entity or other group of individuals or entities associated with a single subscriber account. In still another embodiment, each of the customers contact the communications center via the same type of service channel (e.g., the customers are different individuals and contact the communications center using the voice service channel). In another embodiment, the customers are different individuals and contact the communications center via a number of different methods using a common type of service channel (e.g., a first customer initiates a chat session and a second customer initiates a videoconference session via the Internet service channel).

In step S300b, the same customer (or a different customer associated with a common subscriber account, as explained above) contacts the communications center via an Internet service channel. The self-service web portal accesses the subscriber profile data store in step S302b. The web portal establishes a contact session log also in step S302b. In step S304b, the customer requests to chat with an agent. In step S306b, the resource optimizer obtains and updates agent state information from the common contact routing engine. In an alternative embodiment, the resource optimizer obtains and updates agent state information from each of the voice service channel routing engine, the Internet service channel routing engine and the multimedia routing engine. Also in step S306b, the resource optimizer updates mapping information relating the agents servicing contact sessions and the senders of the communications. In step S308b, the common contact routing engine accesses the resource optimizer and the resource optimizer raises a resource alert with mapping information for the first contact session initiated in step S300. If the agent is enabled to service an Internet contact session, the common contact routing engine routes the Internet contact session to the first agent to which the voice contact session was routed in step S310b. If the first agent is not enabled to service communication received via the Internet service channel, the common contact routing engine instructs the customer that the Internet contact session is not allowed at the current time, in step S312b. In an alternative embodiment, the common contact routing engine routes the customer to a second agent.

A similar process occurs for detecting and routing concurrent contact sessions initiated by two or more users associated with a common account is shown. However, in step S312b, when the first agent is unable to service communications received via an Internet service channel, the common contact routing engine informs a second customer that the Internet contact session is not allowed at the current time because another customer associated with the same subscriber account is currently communicating in a contact session related to a common inquiry or issue.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission, application messaging and data storage represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for routing communications at a communications center, comprising:

servicing a first communication and concurrently receiving a second communication, different from the first communication, at the communications center;

determining, using a tangible first processor, whether a sender of the first communication and a sender of the second communication are associated with a common account; and routing the second communication to an agent based on the determining, wherein the second communication is routed to the agent servicing the first communication when the agent services a first type of service channel and a second type of service channel corresponding to the first communication and second communication, respectively;

wherein the first type of service channel comprises at least one of: voice service channel and a web-enabled service channel, and wherein the second type of service channel, different from the first type of service channel, comprises at least one of: voice service channel and a web-enabled service channel;

wherein the sender of the first communication and the sender of the second communication are members of a common entity for the common account, and wherein the common entity comprises at least one of: an organization, a business, a family and a school.

2. The method according to claim 1, wherein the first communication is routed to the agent and the second communication is routed to a second agent when the agent does not service the second type of service channel.

3. The method according to claim 1, further comprising:

receiving a first request, from the sender of the first communication, for agent-enabled communication; and receiving a second request, from the sender of the second communication, for the agent-enabled communication.

4. The method according to claim 1, wherein the first communication is routed to the agent and the second communication is routed to a second agent when the agent is not enabled to service the second type of service channel.

5. The method according to claim 4, wherein the second communication is routed to the second agent when the agent servicing the first communication is not enabled to service a type of service channel via which the second communication was received.

6. The method according to claim 4, wherein the second communication is routed to the second agent when the agent servicing the first communication is not available to service further communication.

7. The method according to claim 1, further comprising:
querying a resource optimizer, implemented on at least one processor, to determine whether a first communication, associated with the common account, is being serviced.

8. A system for routing communications at a communications center, comprising:
- a receiver that receives a first communication, at the communications center, and concurrently receives a second communication, different from the first communication, at the communications center;
- a resource optimizer, implemented on a first tangible processor, that determines whether a sender of the first communication and a sender of the second communication are associated with a common account; and
- a route determiner, implemented on a second tangible processor, that routes the second communication to an agent based on the determination,
- wherein the first communication is serviced at the communications center, and
- the second communication is routed to the agent servicing the first communication when the agent services the first type of service channel and the second type of service channel corresponding to the first communication and second communication, respectively;
- wherein the first type of service channel comprises at least one of: voice service channel and a web-enabled service channel, and
- wherein the second type of service channel, different from the first type of service channel, comprises at least one of: voice service channel and a web-enabled service channel;
- wherein the sender of the first communication and the sender of the second communication are members of a common entity for the common account, and
- wherein the common entity comprises at least one of: an organization, a business, a family and a school.

9. The system according to claim 8,
wherein the resource optimizer maintains a mapping for a subscriber account to contact session associated with the first communication being serviced.

10. The system according to claim 9,
wherein the resource optimizer sends an alert to the route determiner when a second connect session associated with the second communication is initiated and the mapping exists.

11. The system according to claim 8,
wherein the resource optimizer stores agent state information for the agent.

12. The system according to claim 8,
wherein the route determiner utilizes the agent state information to route the second communication.

13. A non-transitory computer readable medium storing a computer program, recorded on the non-transitory computer readable medium, for routing communications at a communications center, the computer program when executed by a computer comprising:
- a servicing code segment, recorded on the non-transitory computer readable medium, that services a first communication, at the communications center, and concurrently receives a second communication, different from the first communication, at the communications center;
- a determining code segment, recorded on the non-transitory computer readable medium, that determines whether a sender of the first communication and a sender of the second communication are associated with a common account; and
- a routing code segment, recorded on the non-transitory computer readable medium, that routes the second communication to an agent based on the determination,
- wherein the second communication is routed to the agent servicing the first communication when the agent services a first type of service channel and a second type of service channel corresponding to the first communication and second communication, respectively;
- wherein the first type of service channel comprises at least one of: voice service channel and a web-enabled service channel, and
- wherein the second type of service channel, different from the first type of service channel, comprises at least one of: voice service channel and a web-enabled service channel;
- wherein the sender of the first communication and the sender of the second communication are members of a common entity for the common account, and
- wherein the common entity comprises at least one of: an organization, a business, a family and a school.

* * * * *